United States Patent [19]

Groteke

[11] Patent Number: 4,504,392

[45] Date of Patent: * Mar. 12, 1985

[54] APPARATUS FOR FILTRATION OF MOLTEN METAL

[76] Inventor: Daniel E. Groteke, 8 E. Lakeview Dr., Apt. #4, Cincinnati, Ohio 45237

[*] Notice: The portion of the term of this patent subsequent to Jul. 19, 2000 has been disclaimed.

[21] Appl. No.: 368,108

[22] Filed: Apr. 14, 1982

Related U.S. Application Data

[63] Continuation-in-part of Ser. No. 256,829, Apr. 23, 1981, Pat. No. 4,394,271.

[51] Int. Cl.³ .................. B01D 23/00; C22B 9/02
[52] U.S. Cl. ...................... 210/471; 210/510.1; 75/68 R; 266/227
[58] Field of Search ............ 210/773, 470, 471, 510; 75/68 R; 266/227, 229–231, 238

[56] References Cited

U.S. PATENT DOCUMENTS

| | | | |
|---|---|---|---|
| 4,081,371 | 3/1978 | Yarwood et al. | 210/510 X |
| 4,113,241 | 9/1978 | Dore | 210/510 X |
| 4,394,271 | 7/1983 | Groteke | 210/773 |

Primary Examiner—Thomas G. Wyse
Attorney, Agent, or Firm—Janine J. Weins; Michael J. Weins

[57] ABSTRACT

An apparatus and method for filtering molten metal is disclosed. The apparatus includes a filtering vessel, a portion of which is a porous filter material. Attached to the rim of the filtering vessel is a shock resistant ring. The filtering vessel is positioned such that the porous filter material is submerged in the molten metal, and the rim is held above the surface of the molten metal by a brace which is attached to a fixed bracket.

The molten metal is filtered by seeping through the porous filter material into the filtering vessel. The filtered molten metal is extracted from the filtering vessel.

22 Claims, 6 Drawing Figures

APPARATUS FOR FILTRATION OF MOLTEN METAL

This is a continuation-in-part of the application Ser. No. 256,829 filed Apr. 23, 1981 now issued as U.S. Pat. No. 4,394,271.

FIELD OF INVENTION

The present invention relates to an apparatus and a method for filtration of molten metal.

BACKGROUND ART

Molten metal, and in particular molten aluminum, frequently contains impurities which are detrimental to the resulting cast products. These impurities may be oxides of the metal, inclusions introduced by fluxes used during melting, or products formed by interaction with the furnace lining.

One technique for removing oxides and other impurities from molten metal is taught in U.S. Pat. No. 4,113,241 issued to Dore. This patent teaches placing a floatable crucible in a bath of molten metal. A portion of the crucible is porous and serves as a filter. Molten metal passes through the porous filter material and thereby fills the crucible. The metal to be cast is ladled from the crucible. Since the crucible is floatable it is buoyant and the rate of fill will be limited by the rate at which the crucible settles into the molten metal bath. For the crucible of the Dore patent to float in molten aluminum it must be made of a light material such as graphite, which may fracture if impacted by the ladle during removal of the molten metal.

SUMMARY OF INVENTION

The present invention provides an improved apparatus for filtering molten metal. The apparatus includes a filtering vessel, having a bottom with a hole therethrough. A porous material which serves as a filter element is contoured to fit the hole. Means are provided for interlocking the filter element in place in the filtering vessel. The filtering vessel has a rim and attached to the rim is a shock resistant ring. Attached to the ring is a brace, lugs or other means that can be used to position the filter vessel. The filtering vessel preferably has a cross section which is faceted. During operation the filtering vessel is positioned so as to assure that the filter element and a portion of the filtering vessel sufficient to assure good thermal conductivity are submerged in the molten metal bath, while the ring is maintained above the level of the molten metal bath. When the filtering vessel of the present invention is made from a castable refractory it is preferred that the walls and hardware of the filtering vessel be reinforced with a reinforcing mesh, such as a glass cloth. The incorporation of a reinforcing mesh greatly strengthens the filtering vessel and thereby permits the filtering vessel to have thinner walls.

The present invention also relates to a method for filtration of molten metal. A filtering vessel, a portion of which is a porous filter material, is partially submerged in molten metal. The filtering vessel is mounted so as to maintain the porous filter portion of the filtering vessel submerged in the molten metal, and the rim and ring above the surface of the molten metal. Molten metal flows through the porous filter material into the filtering vessel. Filtered metal is extracted from the filtering vessel by a ladle.

BEST MODES FOR CARRYING OUT THE INVENTION

Figure 1:
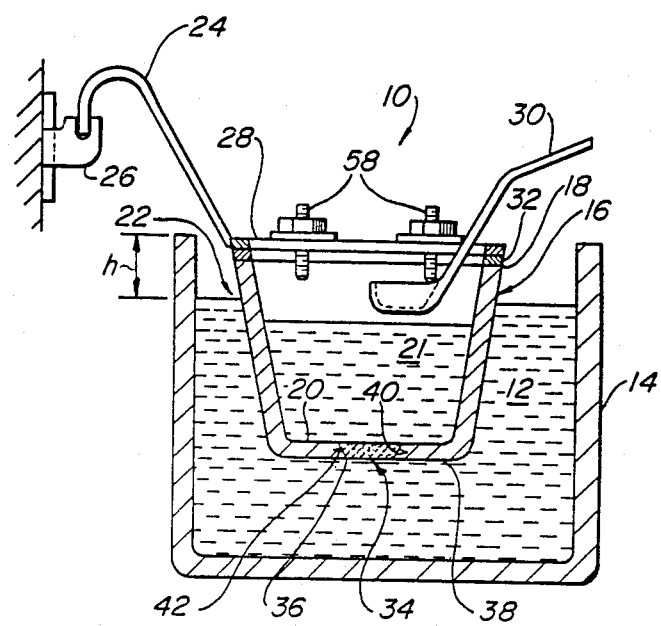
FIG. 1 is a schematic representation of one embodiment of the present invention in which the peripheral edge of the filter element is slopped upward, and the mating sidewall of the hole in the bottom of the filtering vessel slops upward and is undercut.

FIG. 1 is a schematic representation of one embodiment of the present invention. The metal filtering apparatus 10 is employed for removing particulate and purifying the molten metal. THe molten metal bath 12 is contained in a melting or holding furnace 14. The molten metal filtering apparatus 10 consists of a filtering vessel 16 having a rim 18 and a bottom 20. The filtering vessel 16 can be made from any refractory material that exhibits a minimum interaction with the molten metal. It is preferred to use clay graphite, or a castable refractory such as the silica/alumina. Clay graphite is preferred for relatively small filtering vessels, those which contain a small volume of metal. Clay graphite vessels have higher thermal conductivity than do filtering vessels made from a castable refractory, therefore for the clay graphite vessels the temperature drop between the molten metal bath 12 and the metal 21 within the filtering vessel is less than the temperature drop would be for a castable refractory. For larger filtering vessels, those in which the volume of metal within the filtering vessel is large relative to the surface area of the filtering vessel, a castable refractory can be used while still maintaining an acceptable temperature drop between the molten metal bath 12 exterior to the filtering vessel 16 and the molten metal 21 within the filtering vessel 16. Castable refractories have the advantage of longer serviceable life since they are less subject to attack at the molten metal-atmosphere interface 22.

This disadvantage of the lower thermal conductivity of cast filtering vessels can be partially off-set by using a reinforcing mesh, such as a glass cloth to reinforce the walls of the filtering vessel 16. When the walls of the filtering vessel 16 are reinforced with a glass cloth or other reinforcing mesh, a thinner wall can be used with a corresponding increase in the heat transfer. Reinforcing the walls and hardware of a cast filtering vessel can greatly extend the useable life of the filtering vessel by reducing the rate of crack propagation.

It should be appreciated that as the temperature drop between the molten metal bath 12 and the metal 21 within the filtering vessel 16 is increased the temperature of the molten metal bath 12 must be increased to maintain the proper ladling temperature. Increasing the temperature of the molten metal bath 21 will reguire increasing the furnace temperature, will increase the energy costs, will increase the hydrogen solubility in the molten metal, and will increase the interaction of the molten metal with both the furnace lining and the filtering vessel.

Figure 2:
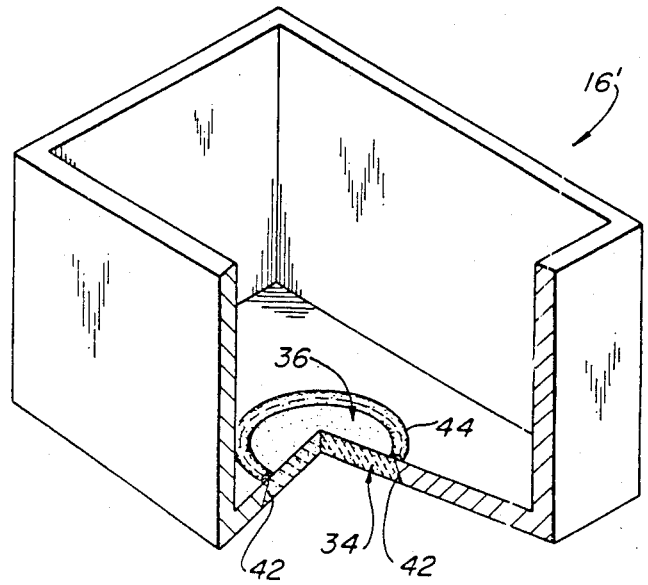
FIG. 2 is a schematic representation one embodiment of the present invention in which a rectangular filtering vessel is used in combination with a circular filter element. The filter element is held in place by the downward sloping peripheral edge of the filter element mating with a downward sloping wall of the hole in the bottom of the filtering vessel, and additionally a bead of refractory cement which penetrates the filter element and extends over the inside bottom surface of the filtering vessel.

To further minimize the temperature drop between the molten metal 21 within the filtering vessel 16 and the molten metal 12 surrounding the filtering vessel 16, the filtering vessel 16 can be made in a square, rectangular, or other faceted configuration. A non-round filtering vessel has a higher ratio of the surface area of the filtering vessel in contact with the molten metal, to the volume of molten metal contained within the filtering vessel, than does a round filtering vessel, the higher surface to volume ratio provides relatively more surface area for heat transfer. Thermally a triangular shape would be preferred, however, because of the difficultly in ladling from a triangular filtering vessel a rectangular filtering vessel 16' such as shown in FIG. 2 is generally preferred. A rectangular vessel has an advantage when metal is removed by a ladle in that metal can be removed using a long stroke, either parallel to the long side, or diagonal from opposite corners.

To further minimize the temperature difference between the molten metal 12 surrounding the filtering vessel 16 and the molten metal 21 contained within the filtering vessel, the filtering vessel 16 should be positioned in the molten metal bath 12 so as to minimize h, the protrusion of the filtering vessel 16. The protrusion, h is adjusted, and the filtering vessel positioned within the molten metal bath 12, by a brace 24 which is attached to a fixture which is rigidly positioned with respect to the molten metal bath 12. The brace 24 is attached to a shock resistant ring 28 which is rigidly attached to the filtering vessel 16. The fixture to which the brace 24 attaches may be an adjustable bracket 26 which can be positioned and locked in position with respect to the molten metal bath 12 while the molten metal is being filtered.

The ring 28 to which the brace 24 is attached serves to protect the brittle filtering vessel 16 by shielding the rim 18 from impact by a ladle 30 which may be employed to remove molten metal 21 contained in the filtering vessel 16. Optionally interposed between the ring 28 and the rim 18 is a layer of low thermal conductivity material 32, such as asbestos. The layer of low thermal conductivity material 32 serves to minimize heat transfer between the filtering vessel 16 and the ring 28, the brace 24 and the bracket 26. By limiting heat transfer between the filtering vessel 16, and the ring 28, the low thermal conductivity material 32 aides in minimizing the temperature difference between the molten metal 12 surrounding the filtering vessel 16, the the molten metal 21 contained within the filtering vessel 16.

When using a faceted filtering vessel such as a square or rectangular vessel 16' a round filter element 34 such as shown in FIG. 2 is preferred. A round filter element 34 is preferred over a rectangular or square filter element because the round filter element 34 does not have corners which can act as stress risers and be sites for the initiation of crack in the filtering vessel.

The filter element 34 is made of a porous ceramic filter material. These ceramic filter materials are typically alumina, zirconia, magnesia, titanium dioxide, silica and mixtures thereof. Such filter materials are known in the art. U.S. Pat. No. 3,962,081 discloses examples of filter materials which can be employed in the present invention. Preferably the filter element has a pore size of between 20 and 80 pores per linear inch, a void fraction between 0.65 and 0.95, and an air permeability of from about 100 to about $1000 \times 10^{-7}$ cm$^2$.

The filter element 34 can be inserted in a hole 36 in the bottom 38 of the filtering vessel 16 as shown in FIG. 1. In one preferred embodiment of the present invention shown in FIG. 1 the wall 40 of the hole 36 in the bottom 38 of the filtering vessel 16 is upwardly sloping and there is an undercut 42 in the wall 40 of the hole 36 in the bottom 38 of the filtering vessel 16. The filter element 34 is cemented in place by a refractory or furnace cement such as those cements principally composed of alumina and/or silica. Having an undercut 42 in the wall 40 of the hole 36 in the bottom 38 of the filtering vessel 16 provides means for locking the filter element 34 in the filtering vessel 16. The undercut 42 minimizes the tendency of the filter element 34 to "pop out" during service. If the wall 40 of the hole 36 in the bottom 38 of the filtering vessel 16 is monotonically tapered with the large diameter towards the top of the filtering vessel 16, and the filter element 34 is held in position by a resilient seal as suggested by Dore in U.S. Pat. No. 4,113,241, the filter element 34 would tend to "pop out" when the filtering vessel 16 was inserted a the molten metal bath, however if the reverse taper were used, such that the larger diameter of the hole 36 in the bottom 38 of the filtering vessel 16 was furthest from the top of the filtering vessel as is illustrated in FIG. 2, the filter element 34 would tend to "pop out" when the filtering vessel 16 was being removed from a molten metal bath 12. The undercut 42 provides support to the filter element 34 by locking in place a bead 44 of refractory cement. This bead 44 of refractory cement is continuous with the refractory cement which surrounds the filter element 34 and has penetrated the pore in the vicinity of the peripheral edge of the filter element 34. This bead 44 of refractory cement is locked in place with respect to both the filtering vessel 16 by the undercut 42, and the filter element 34 by having the refractory cement penetrate the pores of the filter element 34. Using this bead 44 the filter element 34 and the filtering vessel 16 will not tend to separate under mechanical loading resulting from either insertion into, or withdrawal from a molten metal bath 12.

If the peripheral edge of the filter element 34 and the wall 40 of the hole 36 in the bottom 38 of the filtering vessel 16 have monotonically sloping walls 42, and neither wall is undercut as is shown in FIG. 2, the filter element 34 can be interlocked by a bead of cement 44 which flows into the filtering vessel 16 and overlaps the inside surface of the bottom 38 of the filtering vessel 16. This bead 44 serves to make the filter element 34 resistant to separation from the filtering vessel 16 when the filtering vessel 16 is removed from the molten metal bath 12, while the slopping walls 42 make the filter element 34 resistant to separating from the filtering vessel 16 when the filtering vessel 1 is inserted into the molten metal bath 12.

One or more or concave undercuts 42 can be employed to interlock the filter 34. These undercuts 42 can be introduced into the wall 40 of the hole 36 in the bottom 38 of the filtering vessel 16. These undercuts 42 may be introduced into the wall 40 of the hole 36 during casting, machined into the wall 40, or introduced using a rack or forked scrapping device. Having one or more undercuts in the wall 40 of the hole 36 in the bottom 38 of the filtering vessel 16 increases the surface area of the filtering vessel 16 in contact with the refractory cement and allows the cement to form an interlocking seal between the filter element 34 and the wall 40 of the hole 36 in the bottom 38 of the filtering vessel 16. This interlocking seal will support the forces associated with the flow of molten metal into and out of the filtering vessel, and in this manner provides for better bonding of the filter element 34 to the filtering vessel 16.

Figure 5:
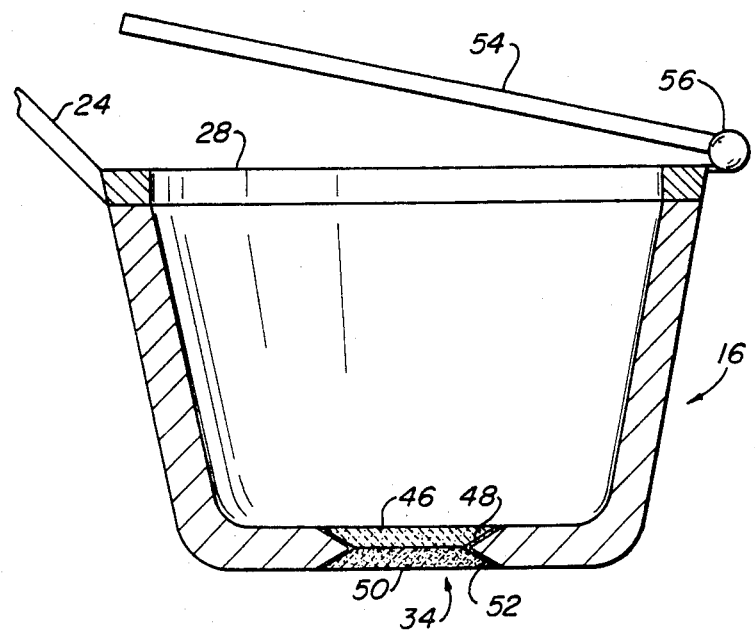
FIG. 5 is a schematic representation of an embodiment of the present invention in which a cover is used to minimize thermal loss and to protect the molten metal. The wall of the hole in the bottom of the filtering vessel has a double bevel, the upper portion of the wall slops upward, while the lower portion of the wall slops downward.

The life expectancy of the filter element 34 can be extended, and/or finer filtration achieved, by employing a two segment filter element as is illustrated in FIG. 5. When it is desired to use a two segment filter element 34, or if the filter element 34 is likely to be subjected to high stress the wall 40 of the hole 36 in the bottom 38 of the filtering vessel 16 can be concave as shown in FIG. 5. This concave configuration when combined with multiple undercuts 42 affords maximum resistance to separation of the filter element 34 from the filtering vessel 16. Loading the filter element 34 from the interior of the filtering vessel 16 forces the first filter segment 46 of the filter element 34 against the protruding surface 48, while the forces applied against the filter element 34 by submersion of the filtering vessel 16 merely forces the second filter segment 50 against the surface 52.

When filtering molten metal containing coarse inclusions it is preferred that the second filter segment 50 shown in FIG. 5 be coarser than the first filter segment 46. Preferably the second segment 50 has a pore size of between 10 and 30 pores per inch while the first segment 46 has a pore size of between about 45 and 80 pores per inch. Having the filter element 34 composed of filter segments of two different pore sizes will achieve finer filtration and will greatly extend the life of the filter element 34.

Optionally a cover 54 shown in FIG. 5 may be attached to a hinge 56 located on the shock resistant ring 28. The cover 54 reduces thermally losses when metal is not being removed from the filtering vessel 16, and reduces the amount of debris that might fall into the filtered metal.

Figure 3:
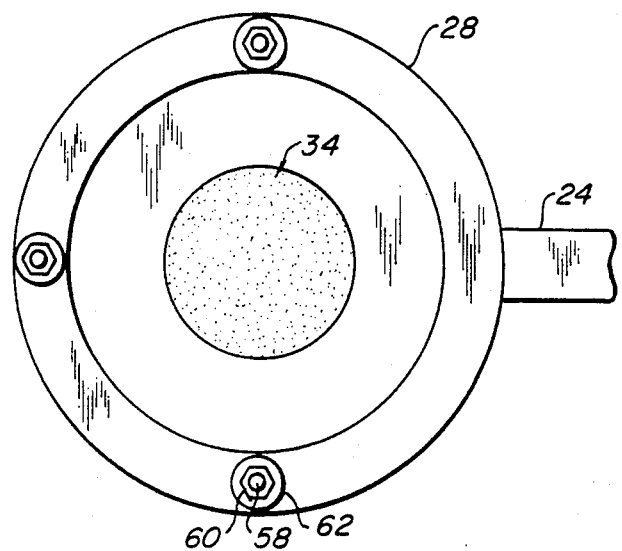
FIG. 3 is a schematic representation illustrating the use of threaded studs cast into the filtering vessel and protruding from the rim of the filtering vessel for attaching a shock resistant ring to the filtering vessel.
Figure 4:
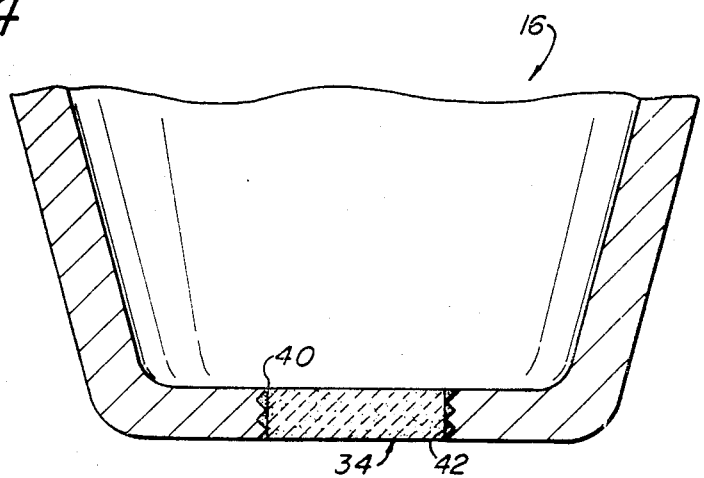
FIG. 4 is a schematic representation of a cross section of the filtering vessel in which the wall of the hole in the bottom of the filtering vessel is substantially vertical and multiply undercut.

The filtering vessel 16 can be attached to the shock resistant ring 28 by threaded studs 58 which may be cast into the filtering vessel 16 as is illustrated by FIG. 3. The shock resistant ring 28 is fitted over the studs 58 and secured in place by nuts 60 and washers 62. When the filtering vessel 16 is made of a castable refractory it is preferred that the studs 58 be wrapped in a re-enforcing material such as a glass cloth before being cast into the filtering vessel 16. Wrapping the studs 58 in a glass re-enforcing cloth greatly strengthens the bond between the studs 58 and the filtering vessel 16, and reduces the likelihood the the studs 58 will separate or pull out of the rim 18 of the filtering vessel 16.

Figure 6:
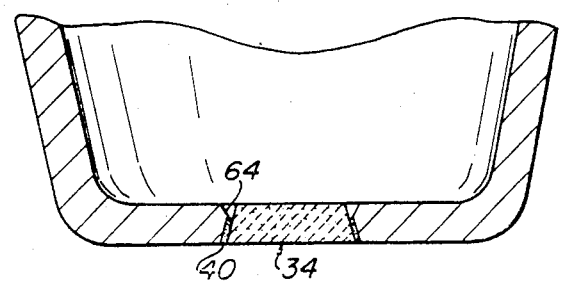
FIG. 6 is a schematic representation of an embodiment of the present invention in which a downward sloping wall of the hole in the bottom of the filtering vessel terminates with an upward sloping bevel at the upper surface of the hole in the bottom of the filtering vessel.

FIG. 6 offers an alternate interlocking means which is a counter-sunk bead 64. If it is advantageous to form a planar surface between the filter element 34 and the filtering vessel 16 and without undercuts being placed within the wall it is possible to bevel the hole 36 at the smaller diameter. Upon cementing the filter element 34 into place the filter element 34 will now be resistant to forces which would tend to push the filter element 34 out of the hole 36.

EXAMPLE I

A 10 inch round clay-graphite filtering vessel of the prior art design with a wall thickness of nominally 1 inch. The walls of the filtering vessel in the vicinity of the filter element had a 17° bevel. A 7 inch in diameter round filtering element having 30 pores per inch was fitted to the filtering vessel. The filter element was held in place in the filtering vessel using a fibrous high temperature compressible gasket material supplied by Foseco. The filtering vessel was submerged in a bath of a molten ASTM 319 (Si 5.5–6.5%, Fe 1.0% max., Cu 3.0–4.0%, Mn 0.5% max, Mg 0.1% max, Ni 0.35% max, Zn 1.0% max, Ti 0.25% max, Al bal.). aluminum alloy. During the first attempt to remove the filtering vessel from the molten metal bath the filter element separate $\frac{5}{8}$ inch from the filtering vessel.

EXAMPLE II

The same 10 inch diameter round clay-graphite filtering vessel as used in Example I was reused after the filtering element separated from the filtering vessel. The filtering element was held in place using a refractory cement. When the refractory cement was used no separation of the filter element from the filtering vessel was detected after the filtering vessel had been used to filter molten 319 aluminum alloy after 40 operating hours.

EXAMPLE III

A 14 inch filtering vessel made from CE Cast 32, a castable alumina and had a wall thickness of nominally 1 inch. The filtering vessel was fitted with a filter element having 30 pores per inch. The filter element was 7 inches in diameter and had a 17° bevel in the wall of the filtering vessel in the vicinity of the filter element. The filter element was held in place using a fibrous high temperature compressible gasket material supplied by Foseco. The filtering vessel was submerged in the bath of molten Zinc-5% aluminum. During the first attempt to remove the filtering vessel the filter element fell out of the filtering vessel under the weight of the heavy zinc alloy.

EXAMPLE IV

The same 14 inch diameter filtering vessel of Example III was used. The filter element was cemented to the filtering vessel using a refractory cement. The filtering vessel was then moved multiply into, out of and within a bath of molten Zn-5% Al alloy. No separation of the filter element from the filtering vessel was detected when the Zn-5%AL Alloy was allowed to drain out of the filter. Subsequently the filtering vessel was used to filter ASTM 319. No movement of the filter was noted after the filtering vessel had been used and drained 20 times.

While the novel features of this invention have been described in terms of preferred embodiments and particular applications, it will be appreciated that various omissions and substitutions in form and in detail of the apparatus and method may be made by those skilled in the art without departing from the spirit of the invention.

What I claim is:

1. A liquid metal filter apparatus for purifying a metal bath, comprising:
   a filtering vessel having a rim, sidewalls, and a bottom, said bottom having a hole therethrough;
   said hole in said bottom of said filtering vessel having a wall, wherein said wall of the hole is substantially vertical;
   a filter element of a porous ceramic material having an open cell structure characterized by a plurality of interconnected pores, said filter element being cemented to said wall of the hole;
   a shock resistant ring attached to said rim;
   a brace rigidly attached to said ring; and
   a bracket rigidly positioned external to the molten metal bath and said brace being attached to said bracket for rigidly positioning said crucible with respect to the molten metal bath.

2. A liquid metal filter apparatus for purifying a metal bath, comprising:
   a filtering vessel having a rim, sidewalls, and a bottom, said bottom having a hole therethrough;
   said hole in said bottom of said filtering vessel having a wall, wherein said wall of the hole is concave;
   a filter element of a porous ceramic material having an open cell structure characterized by a plurality of interconnected pores, said filter element being cemented to said wall of the hole;
   a shock resistant ring attached to said rim;
   a brace rigidly attached to said ring; and
   a bracket rigidly positioned external to the molten metal bath and said brace being attached to said bracket for rigidly positioning said crucible with respect to the molten metal bath.

3. The apparatus of claim 2 wherein said wall of the hole is concave and undercut.

4. A liquid metal filter apparatus for purifying a metal bath, comprising:
   a filtering vessel having a rim, sidewalls, and a bottom, said bottom having a hole therethrough;
   said hole in said bottom of said filtering vessel having a wall, wherein said walls of the hole is substantially convex and said filter element is composed of two or more lamellar sections;
   a filter element of a porous ceramic material having an open cell structure characterized by a plurality of interconnected pores, said filter element being cemented to said wall of the hole;
   a shock resistant ring attached to said rim;
   a brace rigidly attached to said ring; and
   a bracket rigidly positioned external to the molten metal bath and said brace being attached to said bracket for rigidly positioning said crucible with respect to the molten metal bath.

5. The apparatus of claims 1, 2, 3, or 4 wherein said filtering vessel has a faceted configuration.

6. The apparatus of claims 5 wherein said faceted configuration is a rectangular configuration.

7. The apparatus of claim 5 wherein said filter element is comprised of:
   a first filter segment, and a second filter segment second filter segment having a larger pore size than the pore size of said first filter segment.

8. The apparatus of claim 1, 2 or 3 wherein said filtering vessel is cast using a castable refractory.

9. The filtering vessel of claim 8 wherein the sidewalls and the bottom of said filtering vessel are reinforced by a reinforcing mesh.

10. The filtering vessel of claim 9 wherein said reinforcing mesh is a glass cloth.

11. The filtering vessel of claim 8 wherein studs for attaching said shock resistant ring protrude from and are cast into said rim of said filtering vessel.

12. The filtering vessel of claim 11 in wherein the sidewalls and the bottom of said filtering vessel are reinforced by a reinforcing mesh, and the studs are wrapped in said reinforcing mesh before being cast into said filtering vessel.

13. The filtering vessel of claim 12 wherein said reinforcing mesh is a glass cloth.

14. A liquid metal filter apparatus for purifying a metal bath, comprising:
   a faceted configured filtering vessel having a rim, sidewalls, and a bottom, said bottom having a hole therethrough;
   said hole in said bottom of said filtering vessel having a wall, said wall of said hole is undercut;
   a filter element of a porous ceramic material having an open cell structure characterized by a plurality of interconnected pores, said filter element being cemented to said wall of the hole;
   a shock resistant ring attached to said rim;
   a brace rigidly attached to said ring; and
   a bracket rigidly positioned external to the molten metal bath and said brace being attached to said bracket for rigidly positioning said crucible with respect to the molten metal bath.

15. The apparatus of claims 14 wherein said faceted configured filtering vessel is rectangular.

16. The apparatus of claim 14 wherein said filter element is comprised of:
   a first filter segment, and a second filter segment second filter segment having a larger pore size than the pore size of said first filter segment.

17. A liquid metal filter apparatus for purifying a metal bath, comprising:
   a filtering vessel of a castable refractory having a rim, sidewalls, and a bottom, said bottom having a hole therethrough;
   said hole in said bottom of said filtering vessel having a wall, said wall of said hole is undercut;
   a filter element of a porous ceramic material having an open cell structure characterized by a plurality of interconnected pores, said filter element being cemented to said wall of the hole;
   a shock resistant ring attached to said rim;
   a brace rigidly attached to said ring; and
   a bracket rigidly positioned external to the molten metal bath and said brace being attached to said bracket for rigidly positioning said crucible with respect to the molten metal bath.

18. The filtering vessel of claim 17 wherein the sidewalls and the bottom of said filtering vessel are reinforced by a reinforcing mesh.

19. The filtering vessel of claim 18 wherein said reinforcing mesh is a glass cloth.

20. The filtering vessel of claim 17 wherein studs for attaching said shock resistant ring protrude from and are cast into said rim of said filtering vessel.

21. The filtering vessel of claim 20 in wherein the sidewalls and the bottom of said filtering vessel are reinforced by a reinforcing mesh, and the studs are wrapped in said reinforcing mesh before being cast into said filtering vessel.

22. The filtering vessel of claim 21 wherein said reinforcing mesh is a glass cloth.

* * * * *